US010356496B2

(12) United States Patent
Roe et al.

(10) Patent No.: US 10,356,496 B2
(45) Date of Patent: Jul. 16, 2019

(54) CONVERGED PASSIVE OPTICAL LAN (71) Applicant: Accelink Technologies Co., Ltd., Wuhan (CN)

(72) Inventors: Bruce Roe, Rochester, NY (US); Weyl Wang, Duluth, GA (US)

(73) Assignee: Accelink Technologies Co., Ltd. (CN)

( * ) Notice: Subject to any disclaimer, the term of this patent is extended or adjusted under 35 U.S.C. 154(b) by 0 days.

(21) Appl. No.: 15/417,890

(22) Filed: Jan. 27, 2017

(65) Prior Publication Data
US 2017/0214984 A1 Jul. 27, 2017

Related U.S. Application Data (60) Provisional application No. 62/287,653, filed on Jan. 27, 2016.

(51) Int. Cl.
H04B 10/27 (2013.01)
H04Q 11/00 (2006.01)
H04B 10/25 (2013.01)

(52) U.S. Cl.
CPC ..... *H04Q 11/0005* (2013.01); *H04B 10/2504* (2013.01); *H04B 10/27* (2013.01); *H04Q 11/0067* (2013.01); *H04Q 2011/0015* (2013.01); *H04Q 2011/0039* (2013.01); *H04Q 2011/0041* (2013.01)

(58) Field of Classification Search
CPC ....... H04Q 11/0005; H04Q 2011/0039; H04Q 11/0062; H04Q 2011/0052; H04Q 2011/0015; H04Q 11/0067; H04Q 2011/0041; H04B 10/2504; H04B 10/27
See application file for complete search history.

(56) References Cited

U.S. PATENT DOCUMENTS

| | | | | |
|---|---|---|---|---|
| 6,721,797 B1* | 4/2004 | Kim | ..................... | H04L 12/5602 709/223 |
| 9,270,480 B1* | 2/2016 | Som de Cerff | ......... | H04L 41/04 |
| 2007/0064719 A1* | 3/2007 | Tanaka | .................. | H04J 3/1694 370/437 |
| 2008/0260389 A1* | 10/2008 | Zheng | ................ | H04Q 11/0067 398/115 |
| 2009/0106406 A1* | 4/2009 | Bernard | .............. | H04L 41/0856 709/223 |
| 2011/0182588 A1* | 7/2011 | Wojtowicz | ............. | H04B 10/40 398/139 |
| 2013/0318566 A1* | 11/2013 | Inoue | .................. | H04L 12/2885 725/119 |
| 2015/0263810 A1* | 9/2015 | Yao | ..................... | H04B 10/272 398/58 |

* cited by examiner

*Primary Examiner* — Ted M Wang
(74) *Attorney, Agent, or Firm* — Lerner, David, Littenberg, Krumholz & Mentlik, LLP (57) ABSTRACT

The technology relates to a converged passive optical local access network. The converged passive optical local access network may include a network switch, one or more passive optical splitters, one or more optical network terminals, one or more user devices, and a converged optical line terminal. The converged optical line terminal is integrated into a server and comprised of one or more fiber-optic network interface cards. The converged optical line terminal is configured to manage the transmission of data between the converged passive optical local access network and an external network.

19 Claims, 9 Drawing Sheets (PRIOR ART)
FIGURE 1

CONVERGED PASSIVE OPTICAL LAN

BACKGROUND

As the number of network providers converting their existing networks from the use of traditional electrical (i.e., copper) cables to optical fiber increases, owners and operators of local access networks (LANs) are updating the equipment on their local networks to take advantage of the benefits of optical fiber and to assure the ability to connect to the network providers' networks. As a result, owners and operators of the LANs are being forced to upgrade their current equipment, requiring major investments of time and money.

Figure 1:
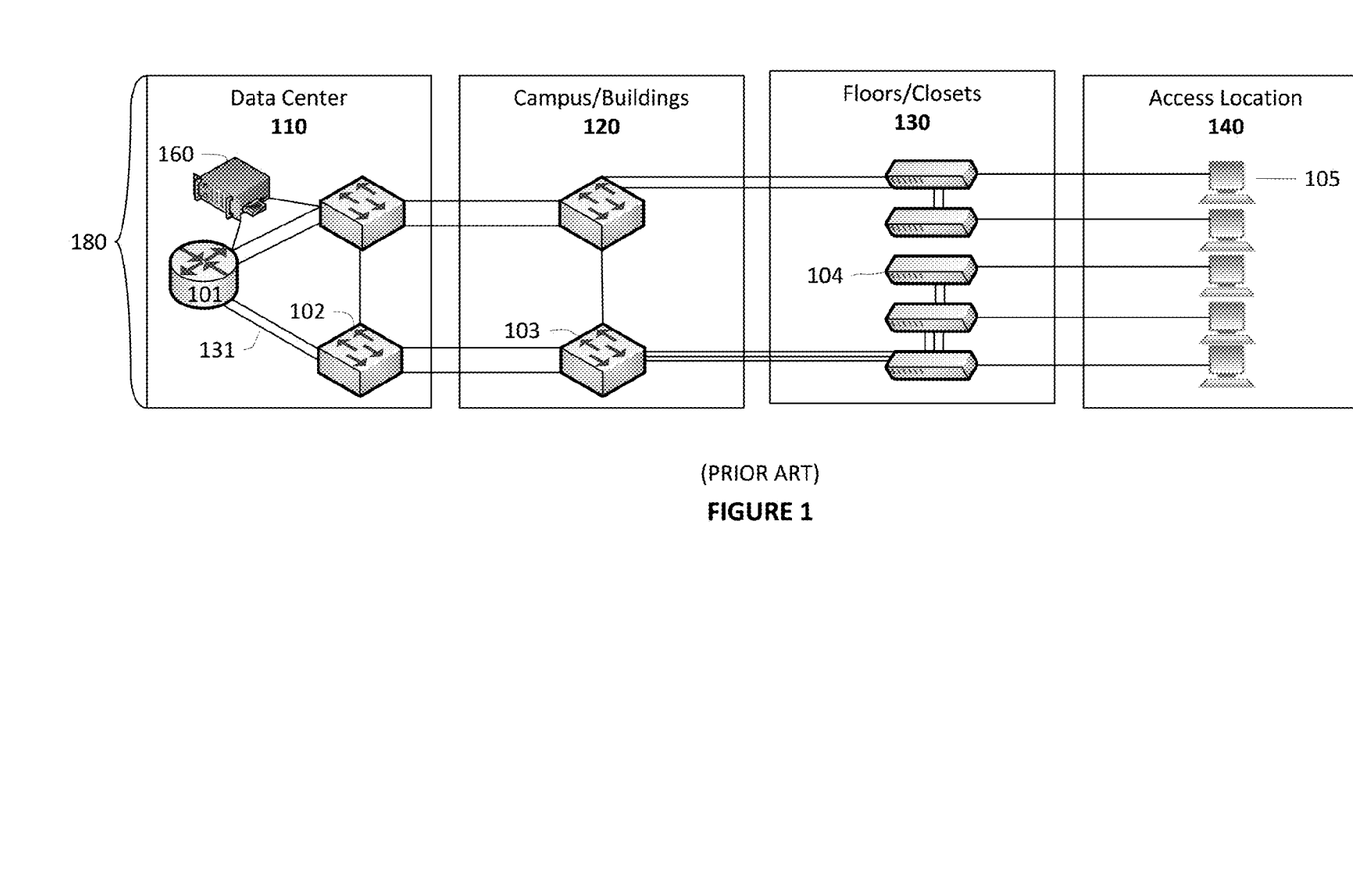
FIG. 1 is an illustration of a prior art traditional local access network.

FIG. 1 illustrates a prior art traditional local access network (LAN) 180 comprised of traditional electrical cabling. The traditional LAN 180 is constructed using Ethernet technology, which defines standardized signaling and networking protocols to allow devices on the traditional LAN to communicate (i.e., transmit and receive packets of data). As shown in FIG. 1, the traditional LAN 180 is separated into discrete parts across a number of locations such as a data center 110, a campus/buildings 120, floors/closets 130, and access location 140. Although FIG. 1 shows these locations as separate places, the locations may be the same place. For example, the data center 110 may be in a closet of a building 130 on a campus.

The traditional LAN 180 communicates with an external network, such as the internet, a wide area network, etc., through a switch and/or router 101 connected to the external network (not shown). In this regard, all incoming and outgoing communication between the external network and the traditional LAN passes through the switch and/or router 101. The switch and/or router 101 communicates with one or more data center switches 102 in the data center 110, or elsewhere. The data center switches 102 control and arrange the transmission of data to and from smaller subsets of the traditional LAN 180, such as subsets of the LAN arranged in particular buildings or locations on a campus. In this regard, communication of data over each smaller subset of the traditional LAN 180 may be controlled and directed by a subset switch, such as subset switch 103. The one or more subset switches 103 in turn communicate with respective local switches 104, to which end user devices 105, such as personal computers are connected. Data may be transmitted within the traditional LAN 180 without being routed through the switch and/or router 101. In other words, data may be transmitted between end user devices 105 and the various switches and router of the traditional LAN 180 without traversing an external network.

Each switch, router, and other component of the traditional LAN 180 may require electrical power, as well as sufficient cooling. The number of switches and routers may be large, depending on the size of the traditional LAN 180, in some cases numbering in the thousands or tens of thousands. As such, the cost to own and operate the traditional LAN 180 involves significant continued expenditures in energy and money to maintain and power the components of the traditional LAN, as well as to provide the necessary cooling for the components to operate.

Communication between the servers, switches, etc., on the traditional LAN 180 occurs over wired connections 131, as further shown in FIG. 1. Such connections are typically copper wire connections, or in some instances, multi-mode fiber (MMF) connections. The copper wire and MMF wire runs are limited to a range of around 100 meters and 550 meters, respectively. Longer runs of wire may be possible, although such runs would require the use of additional components, such as repeaters and boosters which require further expense and power usage. Additionally, multiple runs of wire are needed to provide enough bandwidth within the traditional LAN 180. As such, a large amount of physical space may be required to house the wiring and components of the traditional LAN 180.

Figure 2:
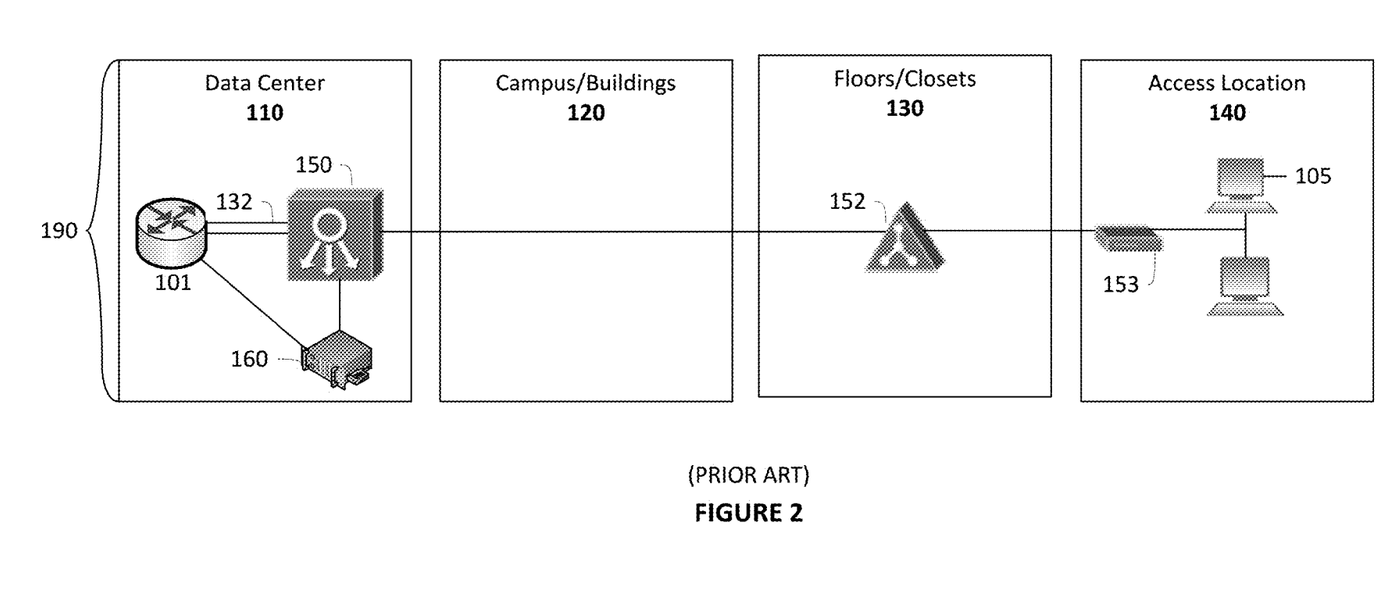
FIG. 2 is an illustration of a prior art passive optical local access network.

Many traditional LANs are being upgraded to passive optical local area networks (POLs). FIG. 2 illustrates a prior art passive optical local area network (POL) 190 constructed of fiber-optic cabling. The POL 190 is constructed in accordance with standardized signaling and networking protocols, such as those developed by the ITU and IEEE, to allow devices on the POL to communicate. As shown in FIG. 2, the POL 190 is separated into discrete parts across a number of locations such as a data center 110, a campus/buildings 120, floors/closets 130, and access location 140. As with the traditional LAN shown in FIG. 1, these locations are shown as separate places, although the locations may be the same place.

The passive optical local network 190 communicates with an external network, such as the internet, a wide area network, etc., through a switch and/or router 101 connected to the external network (not shown). The switch and/or router 101 communicates with an optical line terminal (OLT) in the data center 110, or elsewhere. The OLT controls and arranges the transmission of data to and from one or more optical network terminals (ONTs), or sometimes referred to as optical network units (ONUs), such as optical network terminal 153, located in one or more access locations 140. The ONTs 153 may convert the fiber-optic signals from the OLT into electrical signals and electrical signals from end user devices, such as end user devices 105, into fiber-optic signals. In this regard, end user devices 105 may communicate on the POL 190 through electrical connections with the one or more ONTs.

The signals from the OLT to the ONTs, and vice versa, are transmitted over an optical distribution network (ODN). The ODN may include single mode fiber (SMF) 154 and passive optical splitter 152. Single mode fiber 154 may have a range (i.e., length) of about eighteen miles, or more or less, without the need for signal boosters or repeaters. The range of the SMF 154 is about 300× greater than that of copper wire and MMF wire runs. Moreover, based on the standard implemented by the POL 190, bandwidth may be greater than that offered by a traditional LAN 180. For instance, the POL 190 may operate within defined data rates as shown in table 1, below:

TABLE 1

| Standard | Upstream | Downstream |
| --- | --- | --- |
| 10GEPON | 10 Gbit/s | 10 Gbit/s |
| GPON | 1.25 Gbit/s | 2.5 Gbit/s |
| EPON | 1 Gbit/s | 1 Gbit/s |
| NGPON2 | 4 × 10 G Gbit/s | 4 × 10 G Gbit/s |
| XG-PON | 2.5 Gbit/s | 10 Gbit/s |
| XGS-PON | 10 Gbit/s | 10 Gbit/s |

The passive optical splitter 152 may split the data signals received from the OLT 150 into 64 signals, or more or less. Each split signal may contain the same data as the data signal received from the OLT 150 and each split signal may be sent to a respective ONT 153. Conversely, the passive optical splitter may combine up to 64 signals, or more or less, received from ONTs onto a single SMF. Additionally, the passive optical splitter 152 may operate without the need for a power source (i.e., passively).

The data transmitted from the OLT 150 to user devices may be broadcast to all ONTs on the POL 190. The data may be encrypted in accordance with the network standards. In this regard, the data, although received by every ONT 153, may be readable only by the ONT 153 for which the data was directed. Further, since each respective ONT 153 receives the same signals from the OLT only a single SMF 154 is required to send data to up to 64 ONTs, or more or less.

As such, the POL 190 is configured as a high capacity, point-to-multipoint network, which allows for high user density over a single SMF 154. Thus, the number of cables required to create a POL is, in some instances, significantly less that than needed in a traditional LAN. Further, the POL 190 offers improvements over a traditional LAN 180, such as increased bandwidth while reducing the amount wiring, switches, and other components needed to operate the LAN. Further, the POL 190 requires less power to operate and cool the components, as the number of switches, routers, and other such hardware is thereby leading to decreased cost to operate and run in comparison to a traditional LAN.

One or more network managers may manage the components of the traditional LAN 180 and POL 190 from one or more of the locations through one or more servers, such as server 160, connected to the various switches and/or routers. In this regard, the network managers may program the server to assign bandwidth to certain user devices/switches/routers. Moreover, the server 160 may provide services, such as firewalls, IPTV, DHCP servers, mail servers, etc., to the LANs.

Servers, such as server 160 in the POL 190, may run a management suite of programs. The management suite of programs may allow the server 160 to control the operation of the OLT 150 through a client suite of programs executing on the OLT 150. In this regard, the management suite of programs may control the flow of data through the OLT 150, such as by controlling network traffic of certain types or from particular locations. The management and client suites often require significant time investments by network managers to learn how to program and operate the suites of programs. Further, in order for updates to the client suite of programs on the OLT 150 to occur, the POL 190 typically needs to be shut down and reset to provide the server 160 time to update OLT 150, and for the OLT 150 to update and reset. Likewise, versioning (i.e., assuring compatibility between the versions of the management and client suite of programs,) needs to be maintained, requiring further downtown of the POL 190 when suite updates are needed. Moreover, the cost of the OLT 150 may be significant, often costing tens of thousands of dollars or more. As such, significant costs and time requirements often deter owners and operators of LANs from implementing a POL.

SUMMARY

Embodiments within the disclosure relate generally to a converged passive optical local access network (C-POL) system. Once aspect includes a converged optical line terminal (C-OLT). The C-OLT may be integrated into a server and comprised of one or more fiber-optic network interface cards. The C-OLT may be configured to manage the transmission of data signals between the C-POL and an external network.

In some embodiments the C-POL further comprises a network switch, the network switch configured to direct data between the external network and the C-POL.

In some embodiments the C-POL further comprises one or more optical network terminals configured to convert the data signals from an optical signal to an electrical signal and vice-versa.

In some embodiments the one or more optical network terminals are connected to the one or more user devices with one or more electrical wires.

In some embodiments the C-POL further comprises a converged optical network terminal (C-ONT), comprising an end user device and a second fiber-optic network interface card, wherein the C-ONT is configured to manage the transmission of data signals between the end user device and the C-OLT.

In some embodiments the C-POL further comprises a network switch, one or more passive optical splitters, one or more user devices, and one or more optical network terminals.

In some embodiments the network switch is connected to the C-OLT and the external network.

In some embodiments the one or more passive optical splitters and the one or more optical network terminals are an optical distribution network (ODN), and the one or more user devices communicate via the ODN with the C-OLT.

In some embodiments connections between the C-OLT and the one or more optical network terminals are comprised of single mode fibers.

In some embodiments the C-OLT is connected to a first of the one or more passive optical splitters via a first single mode fiber and the first passive optical splitter is connected to at least two of the one or more optical network terminals via two other single mode fibers, respectively.

In some embodiments the first passive optical splitter is configured to separate a signal from the C-OLT into two or more signals, wherein the two or more signals are copies of the signal from the C-OLT.

Another aspect includes a converged passive optical local access network (C-POL) system comprising a converged optical line terminal (C-OLT). The C-OLT integrated into a server and comprising one or more fiber-optic network interface cards, wherein the C-OLT is configured to manage the transmission of data signals between the C-POL and an external network. The C-POL may further include a converged optical network terminal (C-ONT). The C-ONT may comprise an end user device and a second fiber-optic network interface card, wherein the C-ONT is configured to manage the transmission of data signals between the end user device and the C-OLT.

In some embodiments the C-POL further comprises a network switch, the network switch configured to direct data between the external network and the C-POL.

In some embodiments C-POL further comprises a network switch and one or more passive optical splitters.

In some embodiments the network switch is connected to the C-OLT and the external network.

In some embodiments the one or more passive optical splitters and the one or more optical network terminals are an optical distribution network (ODN), and the one or more user devices communicate via the ODN with the C-OLT.

In some embodiments connections between the C-OLT and the C-ONT are comprised of one or more single mode fibers.

In some embodiments the C-OLT is connected to a first of the one or more passive optical splitters via a first single mode fiber and the first passive optical splitter is connected to the C-ONT via another single mode fiber.

In some embodiments the first passive optical splitter is configured to separate a signal from the C-OLT into two or more signals, wherein the two or more signals are copies of the signal from the C-OLT.

Another aspect includes a converged passive optical local access network (C-POL) system comprising a converged optical network terminal (C-ONT). The C-ONT comprising an end user device and a second fiber-optic network interface card, wherein the C-ONT is configured to manage the transmission of data signals between the end user device and the C-POL.

BRIEF DESCRIPTION OF THE DRAWINGS

The foregoing aspects, features, and advantages of the present invention will be further appreciated when considered with reference to the following description of exemplary embodiments and drawings, wherein like reference numerals represent like elements. In describing the exemplary embodiments of the invention illustrated in the drawings, specific terminology may be used for the sake of clarity. However, the aspects of the invention are not intended to be limited to the specific terms used.

DETAILED DESCRIPTION

In the disclosure below, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with a local access network and/or external network have not been shown or described in detail to avoid unnecessarily obscuring descriptions of the embodiments.

Figure 3:
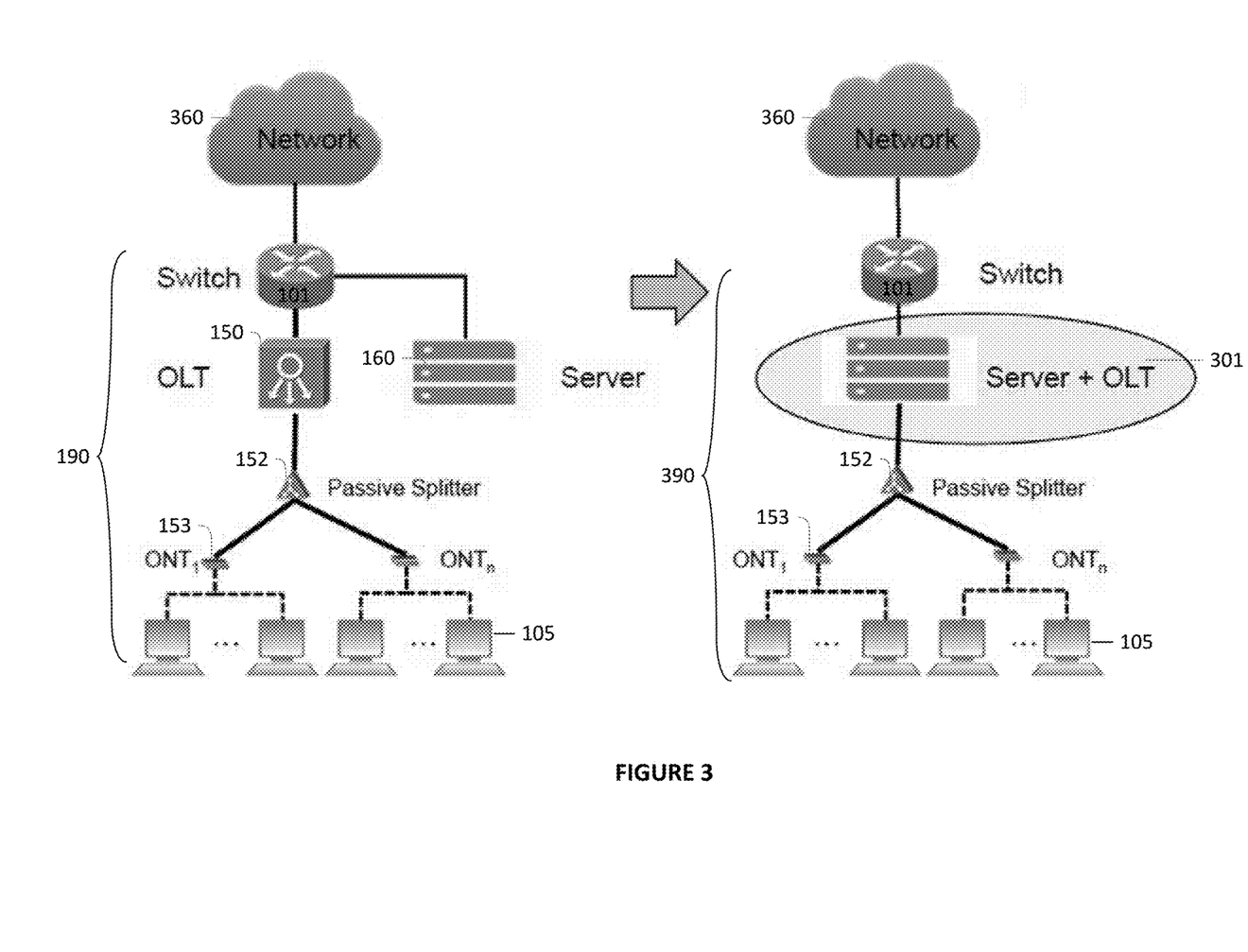
FIG. 3 is an illustration of a converged passive optical local access network in accordance with aspects of the technology.

The technology of the disclosure relates to, by way of example, a converged passive optical local area network (C-POL) where the optical line terminal (OLT) is integrated into a server. For instance, as shown in FIG. 3, the C-POL 390, like the POL 190, may connect with external networks, such as external network 360. As further shown in FIG. 3, the C-POL 390 may also include many of the same components as the POL 190 including a switch and/or router 101, a passive splitter, one or more optical network terminals 153, and one or more user devices 105. Although only a single switch and/or router 101 and passive splitter 152 are shown, there may be more than one passive splitter and/or switch. In contrast with the POL 190, the C-POL 390 integrates server 160 and OLT 150 into a single converged server device 301.

Figure 4:
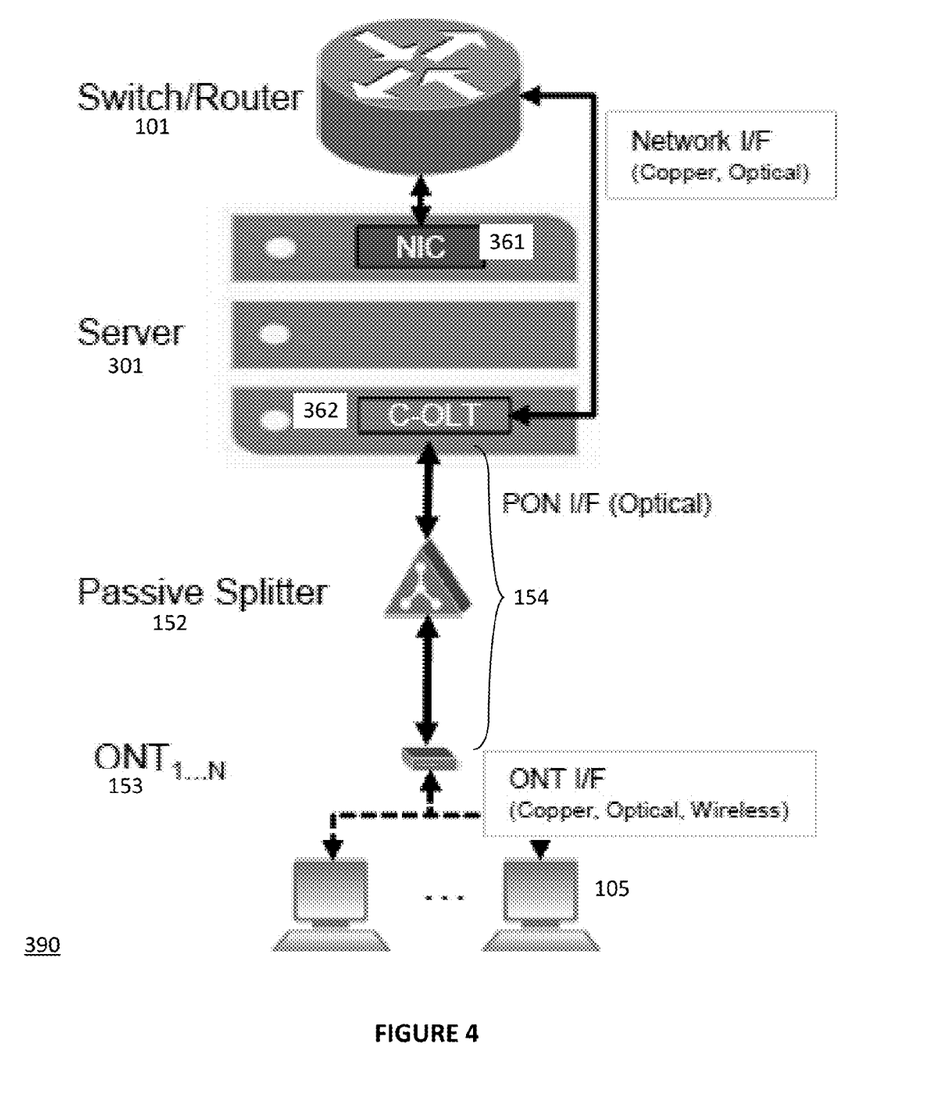
FIG. 4 is an illustration of a converged passive optical local access network including the components of a converged server device in accordance with aspects of the technology.

FIG. 4 includes an example C-POL 390 in which the features described herein may be implemented. It should not be considered as limiting the scope of the disclosure or usefulness of the features described herein. In this example, C-POL 390 can include end user devices 105. Each end user device 105 may contain one or more processors, memory, and other components typically present in general purpose computing devices, as discussed further herein. The C-POL 390 may further include one or more ONTs 153 and a switch and/or router 101.

The converged passive optical local area network (C-POL) may further include the converged server device 301. Although only a single converged server device 301 is shown, multiple converged server devices may be present in the C-POL. As further shown in FIGS. 4 and 5, the converged server device 301 may include a network interface card (NIC) 361 connected to the switch/router 101, whereby data from the external network 360 and the server 301 may be transmitted. The communication between the external network 360 and the NIC 361 may occur over electrical or fiber-optic wiring. The converged server device 301 contains a fiber-optic NIC (C-OLT) 362, to serve the functions of an OLT. Although only a single C-OLT 362 is shown, a server may contain many fiber-optic NICs. The ONTs 153 and the C-OLT 362 communicate via the optical distribution network (ODN) 154. Further, the C-OLT 362 may communicate directly with the switch and/or router 101 via a copper or optical connection, as further shown in FIG. 4. As previously discussed, the ODN may include single mode fiber (SMF) 154 and one or more passive optical splitters 152. Communication between the ONTs 153 and the end user devices 105 occurs via optical or electrical wiring.

Figure 5:
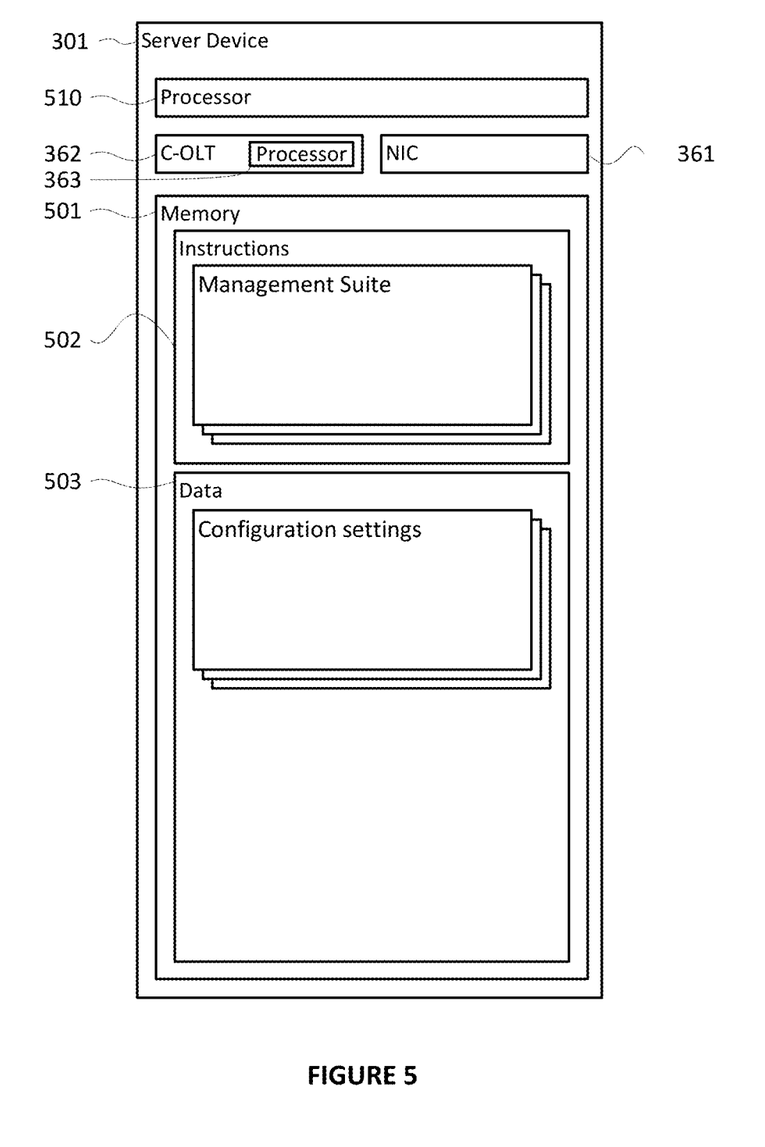
FIG. 5 is an illustration of a converged server device in accordance with aspects of the technology.

Referring to FIG. 5, the converged server device 301 may contain memory 501 which can store information accessible by the one or more processors 510, including instructions 502 that can be executed by the one or more processors 510. The instructions 502 can be any set of instructions to be executed directly, such as machine code, or indirectly, such as scripts, by the one or more processors. In that regard, the terms "instructions," "application," "steps," and "programs" can be used interchangeably herein. Such instructions may include the management suite. It should be noted that in the C-OLT 362, no client suite may be necessary, as the OLT is integrated into the converged server device 301. Instructions may further include programs which assign bandwidth, provide services, IPTV, DHCP server, firewall, mail server, etc.

The instructions can be stored in any type of format including object code format for direct processing by the one or more processors 510, or in any other programming language, including scripts or other snippets of code.

Memory can also include data 503 that can be retrieved, manipulated or stored by the one or more processors 510. The memory can be of any non-transitory type capable of storing information accessible by the processor, such as a hard-drive, memory card, ROM, RAM, DVD, CD-ROM, write-capable, and read-only memories. Data 503 may be retrieved, stored or modified by the one or more processors 510 in accordance with the instructions 502. For instance, although the subject matter described herein is not limited by any particular data structure, the data can be stored in computer registers, in a relational database as a table having many different fields and records, or XML documents. In some instances the data may include configurations settings for the applications, user settings, etc.

The one or more processors 510 can be commercially available CPUs, such as Intel's Xeon processors or AMD processors. The C-OLT 362 may also include one or more processors 363, as described further herein. The processors can be dedicated components embedded within an application specific integrated circuit ("ASIC") or a discreet hardware-based processor.

Although the components of the converged server device 301 are shown within the same block, the components may be located at different locations. Further, although FIG. 4 functionally illustrates many of the components as single blocks, each there may be more than one processor 510, C-OLT 362, NIC 361, memory 501, etc. Moreover, although some functions described below are indicated as taking place on a single converged server device 301 having a single processor, various aspects of the subject matter described herein can be implemented by a plurality of computing devices, for example, communicating information over network 390.

Referring back to FIG. 4, each of the computing devices, including the switch and/or router, converged server device 301, ONTs 153 and end user devices can be at different nodes of the C-POL network 390 and capable of directly and indirectly communicating with other nodes of the C-POL and external network 360. The external network 360 can be part of the Internet, World Wide Web, specific intranets, wide area networks, or other local networks. The external network 360 can utilize standard communications protocols, such as Ethernet, WiFi and HTTP, protocols that are proprietary to one or more companies, and various combinations of the foregoing. Moreover, communication between the end user devices 105 and the ONTs 153 may occur over these communication protocols. Although certain advantages are obtained when information is transmitted or received as noted above, other aspects of the subject matter described herein are not limited to any particular manner of transmission of information.

End user devices 105 may each comprise a full-sized personal computing device or a mobile computing device or other device which are capable of wirelessly, or through a wired connection, exchanging data over a network such as the C-POL 390. By way of example only, end user devices 105 may be mobile phones and/or devices such as PDAs, a tablet PC, or a netbook that is capable of obtaining information via the Internet. In another example, end user devices 105 may be a head-mounted computing system or another device such as a device considered part of the internet of things (IoT).

Figure 6:
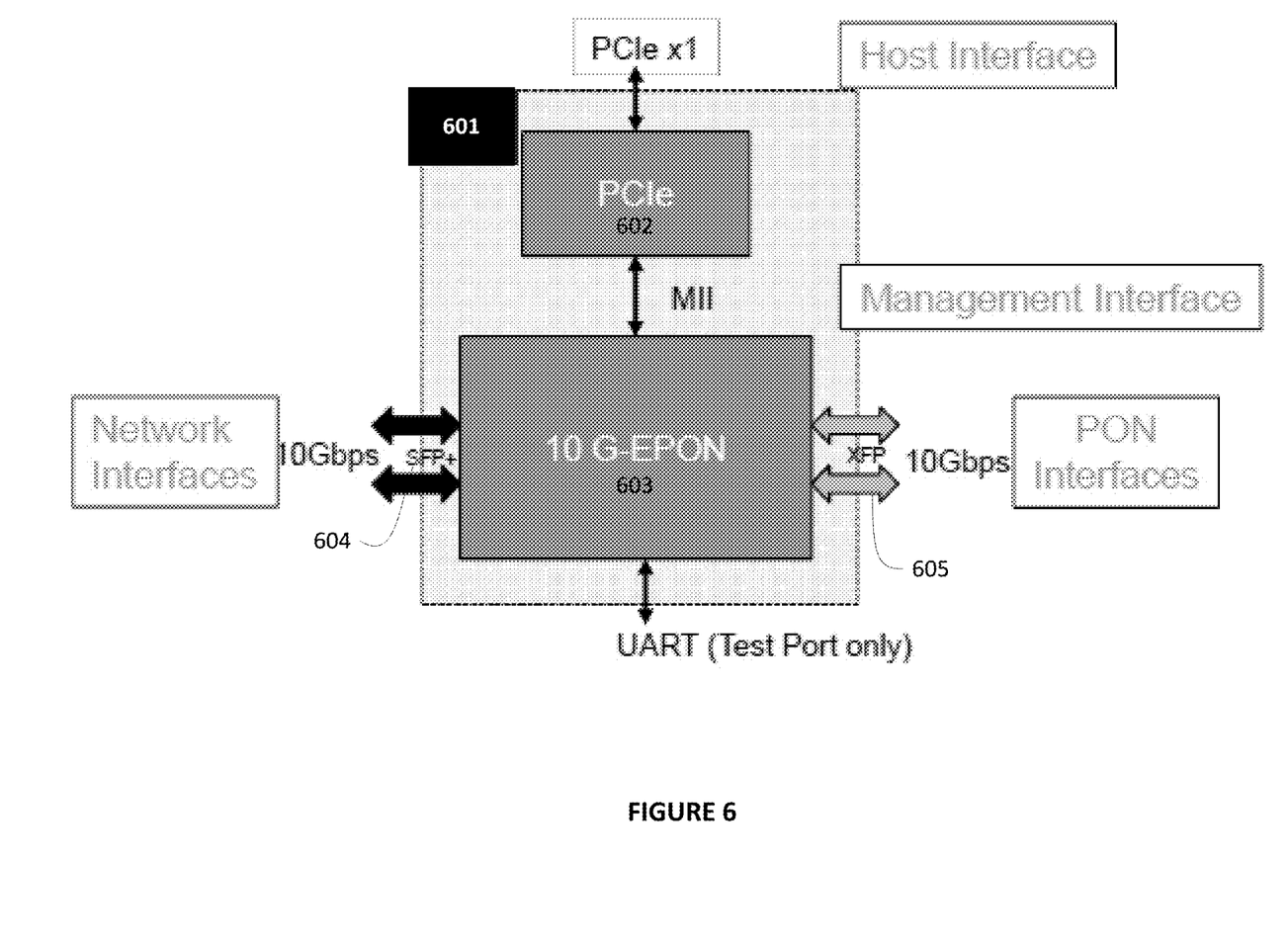
FIG. 6 is an illustration of a network interface in accordance with aspects of the technology.

Turning now to FIG. 6, an exemplary C-OLT 601 is shown. The C-OLT 601 may include be an OLT PON ASIC 603, or other such processor, which may be configured to operate in accordance with a standard such as 10G-EPON. The OLT PON ASIC may communicate with the network interface (i.e., the router and/or switch 101) via a small form-factor pluggable transceiver (SFP) 604 or other such optical connector. The OLT PON ASIC may communicate on the C-POL 390 via another small form-fact pluggable 605, such as an XFP pluggable transceiver. In some embodiments the C-OLT 601 may include a UART test port, as further shown in FIG. 6.

The C-OLT may connect into the server via a bus, such as PCIe Bus 602. Although a PCIe bus is shown, any type of bus capable of meeting the bandwidth needed to operate the OLT PON ASIC 603 may be used.

In the event C-OLT 362 in FIG. 4 is configured as C-OLT 601, the converged server device 301 may connect to the switch and/or router 101, and subsequently, an external network 360, via the NIC 361. In this regard, in order for the converged server device 301 to communicate with other devices on the C-POL 390, the converged server device may transmit data from the NIC 361 through the switch and/or router 101, which may then direct the data through the SFP 604 of the C-OLT 601 and out the XFP 605 to the other devices on the C-POL 390.

Figure 7:
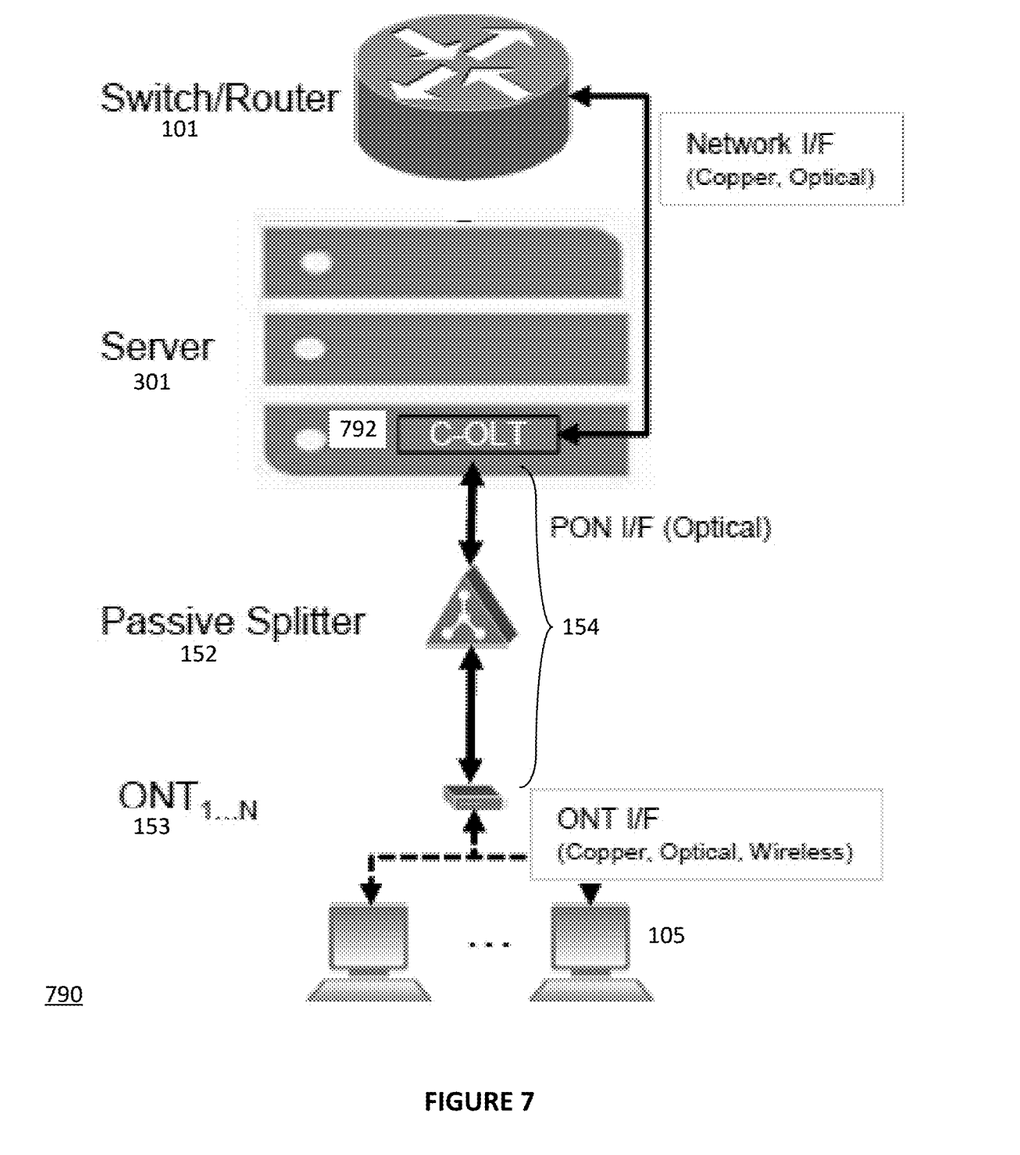
FIG. 7 is an illustration of a converged passive optical local access network including the components of another converged server device in accordance with aspects of the technology.

FIG. 7 includes another exemplary C-POL 790 in which the features described herein may be implemented. In this regard, like the C-POL 390 shown in FIG. 4, the converged passive optical local area network (C-POL) of FIG. 7 may include one or more converged server devices 301. As further shown in FIG. 7, the converged server device 301 may include a modified fiber-optic NIC (C-OLT) 792, to serve the functions of an OLT, as well as the NIC 361. In this regard, unlike the converged server device of FIG. 4, the converged server device of FIG. 7 does not include a NIC 361. The ONTs 153 and the C-OLT 792 may communicate via the optical distribution network (ODN) 154. Further, the C-OLT 792 may communicate directly with the switch and/or router 101 via a copper or optical connection, as further shown in FIG. 7. As previously discussed, the ODN may include single mode fiber (SMF) 154 and one or more passive optical splitters 152. Communication between the ONTs 153 and the end user devices 105 occurs via optical or electrical wiring.

Figure 8:
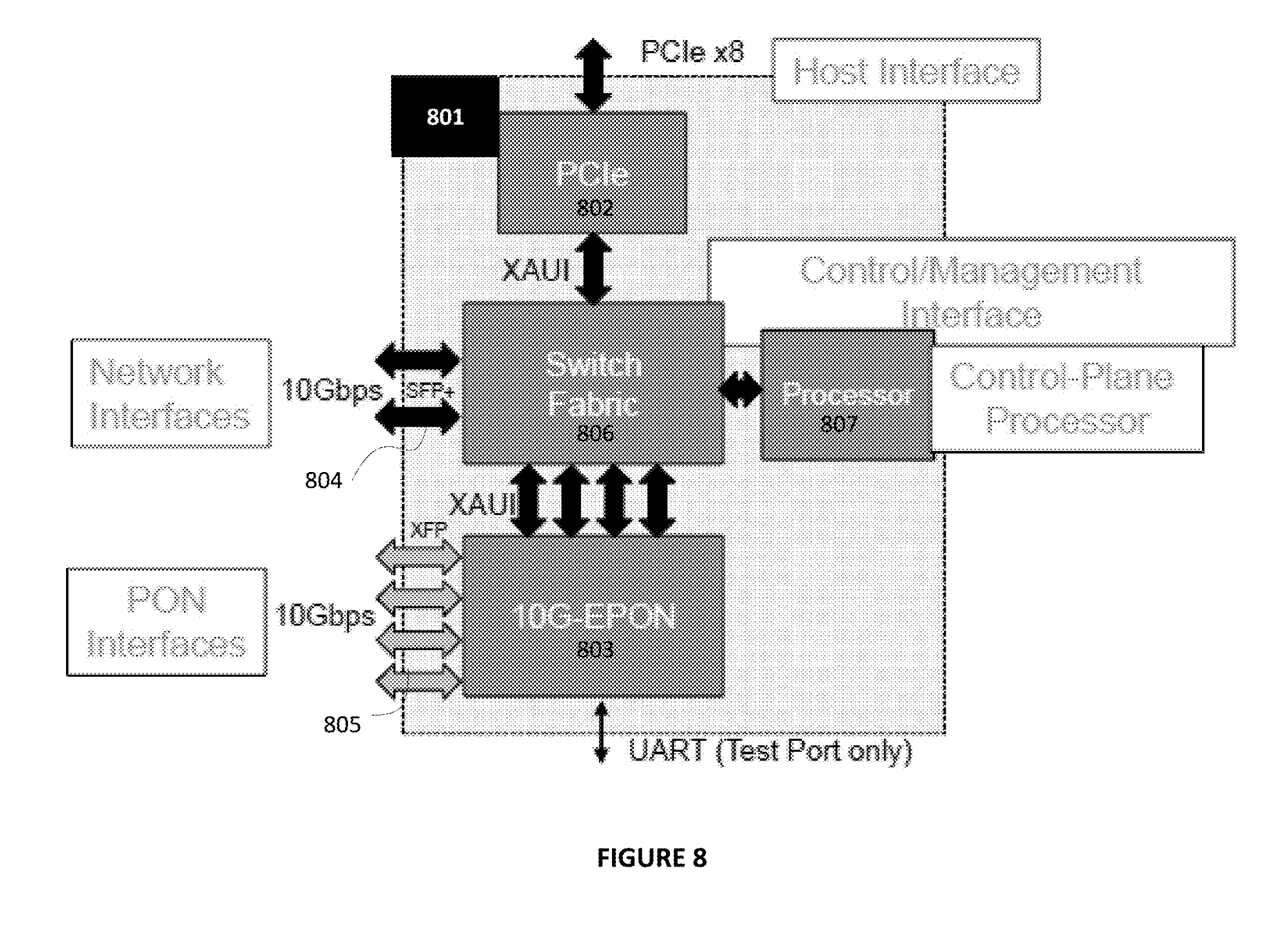
FIG. 8 is an illustration of another network interface in accordance with aspects of the technology.

Turning now to FIG. 8, an exemplary C-OLT 601 is shown. The C-OLT 601 may include an OLT PON ASIC 803, or other such processor, which may be configured to operate in accordance with a standard such as 10G-EPON. The OLT PON ASIC 803 may communicate on the C-POL 390 via another small form-fact pluggable 805, such as an XFP pluggable transceiver.

In the event C-OLT 792 in FIG. 4 is configured as C-OLT 801, the converged server device 301 may connect to the switch and/or router 101, and subsequently, an external network 360, as well as with other devices on the C-POL 390 through the C-OLT 801. In this regard, the C-OLT 801 may include a switch fabric 806 and a processor 807. The switch fabric may coordinate all data which is transmitted and received by the converged server device 301.

The processor 807 may manage the switch fabric 806, thereby providing the converged server device 801 to control some, none, or all aspects of the transmission of data to and from the converged server device. For instance, the switch fabric may be programmed to pass all information from, or directed to the C-POL 790 from the C-OLT 792 to the processor 510 and/or memory 501 of the converged server device 301. In another example, the switch fabric may be programmed direct traffic to the converged server processor 510 based on type of traffic, so that the server processor may perform targeted deep packet inspection and/or perform other such functions performed by a server, such as assign/limiting/throttling bandwidth and/or providing services such as IPTV, VoIP processing, a DHCP server, a firewall, a mail server, etc., directly to the C-POL 790. The processor 807 receives instructions from the server through either the switch fabric and/or directly from a bus connection, such as the PCIe connection. Accordingly, network managers may directly program the C-OLT 792 from the converged server device 801.

The converged server device facilitates novel access-network service provisioning methods, such as the Software-Defined Network (SDN) provisioning, for end-user services offered on the POL networks, by including the required software stacks on the server.

Figure 9A:
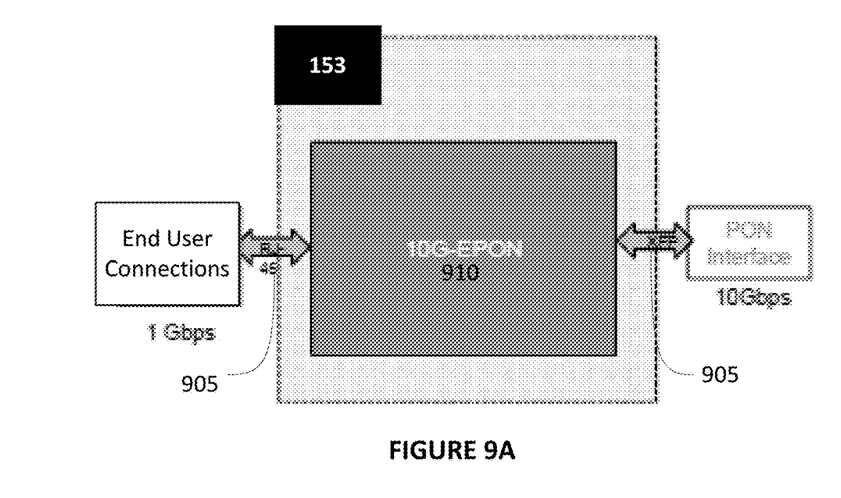
FIG. 9A is an illustration of an optical network terminal interface in accordance with aspects of the technology.
Figure 9B:
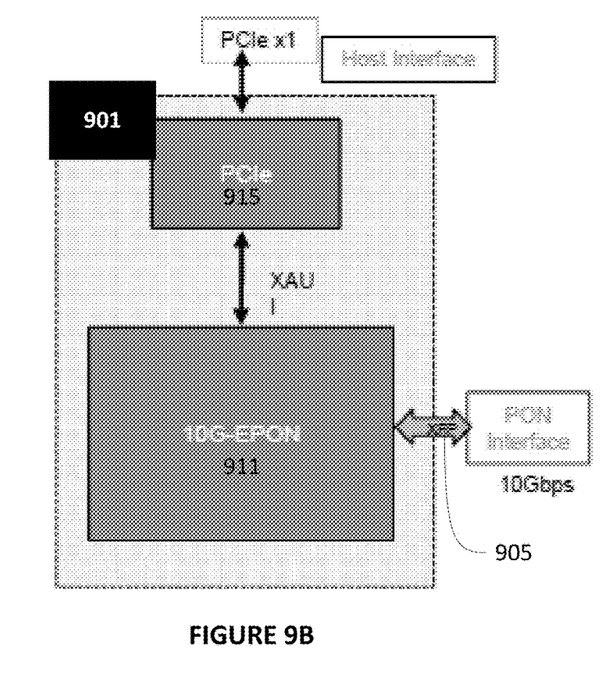
FIG. 9B is an illustration of a converged terminal interface in accordance with aspects of the technology.

Referring now to FIGS. 9A and 9B, the ONTs 153 may be incorporated into user devices 105 using a converged ONT 901. In a typical POL 190 an individual SMF may be connected on one end to the passive optical splitter 152 and on the other end to an ONT 153. The ONT 153 may then connect to one or more end user devices 105. As such, each ONT 153 in the POL 190 requires a fiber or copper run, as well as connection to all of the end user devices 105. Turning to FIG. 9A, the ONT 153 may be constructed of one or more fiber-optic transceivers, and an ONT PON ASIC 910, or other such processor, which may be configured to operate in accordance with a standard such as 10G-EPON. The ONT PON ASIC 910 may convert electrical signals from the user devices to optical signals and optical signals from the ODN 154 to electrical signals. The conversion of the signals may be controlled and performed by a fiber-optic transceiver, the ONT PON ASIC 910, or another processor within the ONT 153. The ONT 153 may connect with end user devices via a registered jack RJ-45, or other such connector. The ONT 153 may connect with the ODN via a small form-fact pluggable 905, such as an XFP pluggable transceiver. The ONT 153 may require a power source.

Referring now to FIG. 9B, the converged ONT 901 may include a modified fiber-optic NIC (C-ONT) 911, to serve the functions of an ONT 153. In this regard, unlike the ONT 153, the converged ONT 901 is integrated into a user device 105 via a bus, such as the PCIe bus 915 or USB 3.0 bus, or another bus capable of handling the bandwidth required to operate the C-ONT. The C-ONT 901 may communicate with the optical distribution network (ODN) 154 via a small form-fact pluggable 905, such as an XFP pluggable transceiver. Further, the C-ONT 901 may communicate with one or more end user devices via a direct connection, such as the PCIe bus. Accordingly, no separate connection from the C-ONT 901 and the end user device 105 is necessary. Therefore, no electrical or cable runs are needed to connect the C-ONT 901 to the end user devices 105. Moreover, the C-ONT 901 may receive power through the PCIe bus, negating the need for an additional power source, as is needed by the ONT 153.

Based on the foregoing, the present disclosure provides for a local access network which eliminates the need for a stand-alone OLT and server, by providing an integrated server device 301 which serves the functions of both the server and the stand-alone OLT. As such, there is a significant reduction in expense to implement an optical local access network as the cost of a standalone OLT is avoided. Moreover, since the OLT is integrated into the server device 301, no additional cable runs are necessary between the server and the OLT. Furthermore, by integrating the OLT 150 into the server, a reduction in equipment cost and maintenance time is realized as there is a reduction in the need to control versioning and learn constantly evolving server to OLT management protocols. Moreover, novel access-network service provisioning methods such as SDN can be seamlessly employed. Even further, by integrating the ONTs 153 into end user devices 105, further wiring reductions may be realized along with a reduction of power usage, thereby reducing the cost to operate the converged passive optical local access network even further.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A converged passive optical local access network (C-POL) system comprising:
a converged optical line terminal (C-OLT), the C-OLT comprising a server hardware platform and a pluggable one or more fiber-optic network interface cards integrated with an optical line terminal (OLT) passive optical network (PON) application-specific integrated circuit (ASIC), wherein the one or more OLT fiber-optic network interface cards are plugged into the server via one or more internal interconnects;
memory integrated into the C-OLT, wherein the memory stores management suite software, which when executed by one or more server processors manages the flow of data signals through the OLT and the transmission of the data signals between the C-POL and an external network in accordance with a PON network standard; and
a converged optical network terminal (C-ONT) comprising a second fiber-optic network interface card integrated into an end user device, wherein the C-ONT is configured to manage the transmission of data signals between the end user device and the C-OLT.

2. The C-POL of claim 1, wherein the C-POL further comprises a network switch, the network switch configured to direct data between the external network and the C-POL.

3. The C-POL of claim 1, wherein the C-POL further comprises one or more optical network terminals configured to convert the data signals from an optical signal to an electrical signal and vice-versa.

4. The C-POL of claim 3, wherein the one or more optical network terminals are connected to one or more user devices with one or more electrical wires.

5. The C-POL of claim 1, further comprising
a network switch;
one or more passive optical splitters;
one or more user devices; and
one or more optical network terminals.

6. The C-POL of claim 5, wherein the network switch is connected to the C-OLT and the external network.

7. The C-POL of claim 6, wherein the one or more passive optical splitters and the one or more optical network terminals are an optical distribution network (ODN), and the one or more user devices communicate with the C-OLT via the ODN.

8. The C-POL of claim 6, wherein connections between the C-OLT and the one or more optical network terminals are comprised of single mode fibers.

9. The C-POL of claim 5, wherein the C-OLT is connected to a first of the one or more passive optical splitters via a first single mode fiber and the first passive optical splitter is connected to at least two of the one or more optical network terminals via two other single mode fibers, respectively.

10. The C-POL of claim 9, wherein the first passive optical splitter is configured to separate a signal from the C-OLT into two or more signals, wherein the two or more signals are copies of the signal from the C-OLT.

11. The C-POL of claim 9, wherein the first passive optical splitter is configured to separate a signal from the C-OLT into two or more signals, wherein the two or more signals are copies of the signal from the C-OLT.

12. A converged passive optical local access network (C-POL) system comprising:
    a converged optical line terminal (C-OLT), the C-OLT comprising a server hardware platform and a pluggable one or more fiber-optic network interface cards, integrated with an optical line terminal (OLT) passive optical network (PON) application-specific integrated circuit (ASIC), wherein the one or more OLT fiber-optic network interface cards are plugged into the server via one or more internal interconnects; and
    a first converged optical network terminal (C-ONT), the first C-ONT comprising a second fiber-optic network interface card integrated into an end user device, wherein the C-ONT is configured to manage the transmission of data signals between the end user device and the C-OLT.

13. The C-POL of claim 12, wherein the C-POL further comprises a network switch, the network switch configured to direct data between the external network and the C-POL.

14. The C-POL of claim 12, further comprising
    a network switch;
    one or more passive optical splitters; and
    a plurality of C-ONTs, wherein each of the plurality of C-ONTs is integrated into a respective end user device.

15. The C-POL of claim 14, wherein the network switch is connected to the C-OLT and the external network.

16. The C-POL of claim 15, wherein the one or more passive optical splitters and the plurality of C-ONTs are an optical distribution network (ODN), and the end user devices communicate with the C-OLT via the ODN.

17. The C-POL of claim 14, wherein the C-OLT is connected to a first of the one or more passive optical splitters via a first single mode fiber and the first passive optical splitter is connected to the C-ONT via another single mode fiber.

18. The C-POL of claim 12, wherein connections between the C-OLT and the C-ONT are comprised of one or more single mode fibers.

19. A converged passive optical local access network (C-POL) system comprising:
    a converged optical line terminal (C-OLT), the C-OLT comprising a server hardware platform and a pluggable one or more fiber-optic network interface cards, integrated with an optical line terminal (OLT) passive optical network (PON) application-specific integrated circuit (ASIC), a; and
    a converged optical network terminal (C-ONT), the C-ONT comprising a second fiber-optic network interface card integrated into an end user device, wherein the C-ONT is configured to manage the transmission of data signals between the end user device and the C-POL.

* * * * *